Patented Sept. 26, 1933

1,928,257

UNITED STATES PATENT OFFICE 1,928,257

MANUFACTURE OF NONDYEING SULPHURIZED DERIVATIVES OF PHENOLS

Hans Leemann and Valentin Kartaschoff, Basel, Switzerland, assignors to the firm Chemical Works Formerly Sandoz, Basel, Switzerland No Drawing. Application October 2, 1930, Serial No. 486,050, and in Germany October 19, 1929

11 Claims. (Cl. 260—18)

It is known that non-dyeing sulphurized derivatives of phenols can be prepared by heating phenols with sulphur in presence of an alkali. It is further known that similar products are obtained if phenol is treated with sulphur chloride. The thioderivatives of phenols thus obtained possess the property of becoming fixed from their aqueous solutions on cotton and of fixing basic dyestuffs thereon. The solutions of these compounds yield with solutions of earth alkali metal or heavy metal salts insoluble, colorless or colored precipitates.

It has now been found that new water soluble sulphurized derivatives of phenols can be prepared by heating phenols, other than those containing nitrogen in presence of alkali and sulphur with compounds of polyvalent metals other than those of the earth alkali metal group. The new products are in dry state more or less colored powders, which are precipitated from their aqueous solutions by addition of mineral acids, some of them being stable against dilute organic acids. The thioderivatives precipitated by the mineral acids contain the metal residue, which is so strongly linked to the thiophenol-complex that even by boiling with diluted mineral acids it cannot be split off. It is probable that the metal residue is linked to the thiophenol residue in a complex manner. On addition of solutions of earth alkali metal and heavy metal salts to the solutions of the new products, the corresponding metal salts of the metalliferous thio-compounds are precipitated. The same are generally difficultly soluble in water and are colorless or colored. The alkali metal salts of the new compounds and their free thio-acids are more or less soluble in methylalcohol, ethylalcohol and acetone, but insoluble in benzene, ether and chloroform. The new products may easily be obtained by heating phenols with alkali and sulphur in presence of a suitable metal or metallic compound and in presence or absence of water.

As phenols the following compounds may be used: phenol, its homologues and substitution products like chlorophenols, phenosulphonic acids, phenolcarboxylic acids, resorcine and others, naphthols and their substitution products like chloronaphthols, naphthol carboxylic and sulphonic acids.

As alkali may be used the hydroxides, the sulphides and the carbonates of the alkali metals and also the hydroxides and the sulphides of the earth alkali metals.

The following metals and their compounds may advantageously be used for carrying out this process: aluminum, antimony, arsenic, lead, cadmium, iron, cobalt, copper, manganese, molybdenum, nickel, mercury, titanium, uranium, vanadium, bismuth, tungsten, zinc, tin, and others. It has been observed that some metals, when being used alone, are very difficulty introduced into the thiophenol complex, but react much easier, when being used together with other metals. For instance bismuth when being used alone is only partly linked to the complex, the greatest quantity thereof remains as sulphide and does not react further. By using bismuth, however, with other metal compounds, e. g. with arsenic compounds, both metals can be easily and completely linked to the thiophenol residue.

To carry out this reaction the metals or their salts may be added to the alkali phenolate or first the corresponding metal phenolate may be prepared and heated with sulphur and alkali; or the phenol may first be partly condensed with sulphur in presence of alkali and the metal salt added to the thus obtained intermediate product, and the mixture produced heated again, whereby the metalliferous derivative is formed.

The relative proportions of alkali sulphur and metals or their salts, which are necessary to obtain the new condensation products may be varied within wide limits and are not limited to the proportions indicated in the examples.

The new thiophenol derivatives possess mordanting, tanning and reserving properties and may further be employed as insecticides and as intermediate products for the manufacture of dyestuffs and pharmaceutical products.

The following examples illustrate the new process, the parts being by weight:

Example 1

45 parts of phenol are mixed with 20 parts of sodium hydroxide, 40 parts of sulphur and 50 parts of water and to the obtained paste are added 10 parts of powdered ammonium molybdate. The mixture thus obtained is then boiled (under a reflux condenser) during 40 hours while well stirring, the temperature being at 107–108° C., whereby great quantities of hydrogen sulphide escape. A dark brown paste is obtained, which becomes hard on cooling and may easily be powdered.

The obtained dark brown-red powder is easily soluble in water and ethyl alcohol with a red coloration, but is difficultly soluble in acetone with a yellowish coloration. On addition to its dilute solution of dilute sulphuric acid an olive-brown precipitate is obtained, but no precipitate occurs on addition of dilute organic acids; with ferric chloride it yields a dull greenish-black precipitate.

The new product possesses the property to act as mordant for basic dyestuffs in a much greater extent than the product obtained under the same conditions, but without addition of ammonium molybdate.

Similar compounds are obtained, if instead of molybdenum, antimony, arsenic, aluminum, manganese, zinc or tin or their suitable salts are used.

Example 2

45 parts of phenol are mixed with 20 parts of sodium hydroxide, 30 parts of sulphur, 20 parts of tin chloride and 20 parts of water. The obtained mixture is heated in an open vessel during 4 hours to 125–130° C., whereby great quantities of hydrogen sulphide are evolved. The obtained thick brown mass is dissolved in water, filtered off from the excess of sulphur and evaporated to dryness or treated with hydrochloric acid. The orange brown precipitate thus obtained is filtered, washed, dissolved in water under addition of soda ash and evaporated to dryness.

The obtained yellow-olive powder is easily soluble in water, ethyl alcohol and acetone with a yellowish coloration. On addition to its dilute solution of dilute sulphuric acid a yellow precipitate is obtained, but no precipitate occurs on addition of dilute organic acids; with ferric chloride it yields a grey precipitate.

The new product possesses the property of becoming fixed on cellulosic fibres without dyeing them. Such mordanted fibres possess a much better fastness to light than the fibres mordanted with the products prepared under exactly the same conditions, but without tin chloride.

It further possesses the property to protect wool against the taking up of substantive and acid dyestuffs, whereas the product prepared without tin salt does not possess this property.

Example 3

45 parts of phenol, 40 parts of calcium hydroxide, 40 parts of sulphur and 50 parts of water are boiled during 30 hours on a reflux condenser; after this time the thick paste obtained is allowed to cool down and 20 parts of antimony pentasulphide are added thereto, well mixed and the mass obtained is further heated for 24 hours. The thus obtained condensation product is dissolved in water, containing 50 parts of soda ash and the solution is filtered and evaporated to dryness.

The obtained grey powder is easily soluble in water and ethyl alcohol with a brownish-yellow coloration, but is difficultly soluble in acetone. On addition to its dilute solution of dilute mineral and organic acids yellowish precipitates are obtained; with ferric chloride it yields greyish black precipitates.

The antominy-containing product yields with basic dyestuffs clear and insoluble lakes and may advantageously be used as a mordant.

Example 4

45 parts of phenol, 20 parts of sodium hydroxide, 30 parts of sulphur, 20 parts of potassium bichromate and 50 parts of water are well mixed together and heated under a reflux for 30 hours at 107–108° C. while well stirring. The obtained thick dark-green paste becomes on cooling very hard and may be easily powdered.

The obtained green powder is easily soluble in water and ethyl alcohol with a green coloration, but is almost insoluble in acetone. On addition to its dilute solution of dilute sulphuric acid a brown precipitate is obtained and it yields with organic acids dull greenish-grey flocks; with ferric chloride a brownish-grey precipitate is obtained.

The new chromium-containing product possesses strong tanning properties.

Example 5

45 jarts of phenol, 40 parts of soda ash, 30 parts of sulphur, 20 parts of aluminum sulphate and 30 parts of water are heated during 50 hours at 104–110° C. on a reflux condenser. The obtained brownish paste is dissolved in water, filtered and dried.

The brownish-olive powder thus obtained is easily soluble in water and ethyl alcohol with a yellowish coloration, but is almost insoluble in acetone. On addition to its dilute solution of dilute acids pure white precipitates are obtained; with ferric chloride it yields a bluish-black precipitate.

With basic dyestuffs it yields pure insoluble lakes and it may be used as a mordant instead of tannin.

Example 6

55 parts of resorcine, 20 parts of sodium hydroxide, 30 parts of sulphur, 15 parts of chromium acetate (26% $Cr_2O_3$) and 15 parts of water are heated during 40 hours at 120° C. The obtained melt is dried in vacuo and powdered.

The dark-brown powder thus obtained is easily soluble in water and ethyl alcohol with a reddish-brown coloration, but is completely insoluble in acetone. On addition to its dilute solutions of dilute mineral acids a brownish precipitate is obtained, whereas the solution remains clear when being acidulated with organic acids; with ferric chloride it yields a reddish-black precipitate.

The new product possesses excellent tanning properties.

Example 7

180 parts of phenol, 20 parts of sodium hydroxide and 20 parts of tin splinters are first heated in an open vessel at about 160° C., the mass is then cooled down and 90 parts of sulphur are added thereto. The obtained mixture is then heated on a reflux condenser during 40 hours at 156–157° C. and cooled down. The obtained grey hard mass is boiled with 100 parts of soda ash and 500 parts of water, whereby it is completely solubilized. By cooling down the new compound precipitates in form of a grey paste, which is separated and dried.

The obtained grey product possesses the same reserving and mordanting porperties as the compound obtained according to the Example 2.

Example 8

116 parts of cresol mixture, 40 parts of sodium hydroxide, 60 parts of sulphur, 40 parts of tin chloride and 25 parts of water are heated until about 30 parts of a mixture of water and cresol are distilled off thereupon, the vessel is closed and the melt is heated under a reflux condenser during 52 hours to 125–127° C., whereby the condensation takes place. The obtained product may easily be powdered and yields a grey powder easily soluble in water, ethyl alcohol and acetone with a yellowish coloration. On addition to its dilute solutions of dilute mineral acids a brown yellow precipitate is obtained; on addition of organic acids the solution remains first clear, but yields grey flocks after some time. With ferric chloride it yields a brown-yellow precipitate. The new product yields with basic dyestuffs difficultly soluble lakes and possesses the property of preserving wool against dyeing with substantive and acid dyestuffs.

Example 9

40 parts of the sodium salt of phenol sulphonic acid (obtained by sulphonating phenol at 25° C.), 10 parts of sodium hydroxide, 20 parts of sulphur, 15 parts of chromium acetate (26% $Cr_2O_3$) and 20 parts of water are heated during 40 hours at 150–170° C. After the condensation is finished, the obtained product is dissolved in water, filtered and the solution evaporated. The product thus obtained constitutes in dry powdered state a greenish powder, easily soluble in water, but almost insoluble in ethyl alcohol and acetone.

The said product possesses substantially the same properties as the product prepared according to Example 8.

Example 10

45 parts of phenol, 23 parts of sodium sulphide, 24 parts of sulphur, 12 parts of tin hydroxide and 15 parts of water are heated during 20 hours, while well stirring, to 109–110° C. After this time the condensation is completely achieved and the obtained plastic brown mass is then dissolved in 250 parts of water. After cooling down the condensation product is salted out. In dry powdered state it constitutes a brown powder easily soluble in water with a brown-yellow coloration, but difficultly soluble in acetone. On addition to its dilute solutions of mineral acids a yellow precipitate is obtained, but the product is not precipitated by dilute organic acids. With ferric chloride it yields a grey-black precipitate.

The new product possesses the same properties as the compound prepared according to Example 2.

What we claim is:

1. A process for the manufacture of nondyeing sulphurized phenol derivatives, consisting in heating phenols, other than those containing nitrogen, with compounds of metals which form insoluble precipitates with ammonium and hydrogen sulphides in the presence of sulphur and an alkali.

2. A process for the manufacture of nondyeing sulphurized phenol derivatives, consisting in heating phenols, other than those containing nitrogen, with compounds of metals which form insoluble precipitates with ammonium and hydrogen sulphides, in the presence of sulphur and a hydroxide of the alkali metal and earth alkali metal groups.

3. A process for the manufacture of nondyeing sulphurized phenol derivatives, consisting in heating phenols, other than those containing nitrogen, with compounds of metals which form insoluble precipitates with ammonium and hydrogen sulphides, in the presence of sulphur and sodium hydroxide.

4. A process for the manufacture of nondyeing sulphurized phenol derivatives, consisting in heating phenols, other than those containing nitrogen, with compounds of the metals of the group consisting of tin, antimony and chromium in the presence of sulphur and sodium hydroxide.

5. A process for the manufacture of nondyeing sulphurized phenol derivatives, consisting in heating phenols, other than those containing nitrogen, with tin compounds in the presence of sulphur and sodium hydroxide.

6. A process for the manufacture of nondyeing sulphurized phenol derivatives, consisting in heating phenols, other than those containing nitrogen, with tin chloride in the presence of sulphur and sodium hydroxide.

7. A process for the manufacture of nondyeing sulphurized phenol derivatives, consisting in heating phenol with tin chloride in the presence of sulphur and sodium hydroxide.

8. A process for the manufacture of nondyeing sulphurized phenol derivatives, consisting in heating cresol with tin chloride in the presence of sulphur and sodium hydroxide.

9. A process for the manufacture of nondyeing sulphurized phenol derivatives, consisting in heating chlorophenol with tin chloride in presence of sulphur and sodium hydroxide.

10. The nondyeing metalliferous sulphurized derivatives of phenols, from the interaction of phenols, other than those containing nitrogen, and compounds of metals which form insoluble precipitates with ammonium and hydrogen sulphides in the presence of sulphur and an alkali, which are easily soluble in alkaline solutions and in water, yielding white to brown precipitations on addition of mineral acids and difficultly soluble compounds with earth alkali metal and heavy metal salts and which possess mordanting, tanning and reserving properties and may be used as insecticides and as intermediates for the production of dyestuffs and pharmaceutical preparations.

11. The tin containing nondyeing sulphurized phenol derivatives from the interaction of phenols other than those containing nitrogen and tin compounds in the presence of sulphur and sodium hydroxide, which constitute in dry state grey brown powders, easily soluble in water with a yellowish coloration, and which are precipitated from dilute solutions by dilute sulphuric acid yielding yellow precipitations, but are stable against dilute organic acids and yield with ferric chloride a grey precipitation, and with basic dyestuffs insoluble lakes and which possess the property of protecting animal fibres against the taking up of substantive and acid dyestuffs.

HANS LEEMANN.
VALENTIN KARTASCHOFF.